United States Patent
Penneck et al.

[11] 3,975,039
[45] Aug. 17, 1976

[54] HEAT-RECOVERABLE MEMBERS

[75] Inventors: Richard J. Penneck, Lechlade; Alexander M. Wood, Swindon, both of England

[73] Assignee: Raychem Corporation, Menlo Park, Calif.

[22] Filed: Oct. 23, 1974

[21] Appl. No.: 517,230

Related U.S. Application Data

[63] Continuation of Ser. No. 195,150, Nov. 3, 1971.

[30] Foreign Application Priority Data
Nov. 3, 1970 United Kingdom............ 52221/70

[52] U.S. Cl.............................. 285/156; 156/86; 264/230; 285/331; 285/371; 285/381; 285/423; 285/DIG. 10; 285/DIG. 16
[51] Int. Cl.².................................. F16L 41/00
[58] Field of Search............ 156/84, 85, 86; 285/21, 285/381, 371, 22, 398, 331, 423, DIG. 10, DIG. 16, 156; 29/447; 264/230

[56] References Cited
UNITED STATES PATENTS

| 3,315,986 | 4/1967 | Quick .................................... 285/21 |
| 3,423,518 | 1/1969 | Weagant ........................ 285/381 X |
| 3,513,429 | 5/1970 | Helsop ............................ 285/381 X |
| 3,539,411 | 10/1970 | Heslop et al. .................... 285/381 X |
| 3,565,116 | 2/1971 | Gabin ............................. 285/381 X |
| 3,567,259 | 3/1971 | Benson et al. ...................... 285/381 |
| 3,695,643 | 10/1972 | Schmunk ....................... 285/423 X |
| 3,700,268 | 10/1972 | Nielsen .............................. 285/249 |

FOREIGN PATENTS OR APPLICATIONS
1,627,727 1/1970 Germany .......................... 285/423

*Primary Examiner*—Dave W. Arola
*Attorney, Agent, or Firm*—Lyon & Lyon

[57] ABSTRACT

A method of recovering a heat-recoverable article onto a hollow substrate, the heat-recoverable article and the substrate each having at least one open end. The method comprises positioning the substrate between a rigid member and the heat-recoverable article, the substrate being positioned in the direction of recovery of the heat-recoverable article and at least part of the rigid member being in contact with the substrate. The heat-recoverable article is then treated to cause recovery thereof. The hollow substrates to which the method of the invention is applied are those which would be distorted if a heat-recoverable article were recovered onto them in the absence of a rigid member. Advantageously, the heat-recoverable article is a heat-shrinkable sleeve and in this case the rigid member is positioned inside the hollow substrate. The method is particularly useful for joining two substrates such as plastic pipes and in this case the heat-shrinkable sleeve may be combined with the rigid member in the form of a coupling device. A fusible material, a mastic or an adhesive may be used to provide a seal between the recovered heat-recoverable member and the substrate(s).

20 Claims, 5 Drawing Figures

HEAT-RECOVERABLE MEMBERS

This is a continuation of application Ser. No. 195,150, filed Nov. 3, 1971.

The present invention relates to the use of a heat-recoverable article to provide a covering on a substrate or a joint between two or more substrates, and to articles which include one or more heat-recoverable articles and may be used in the method of the invention.

Heat-recoverable articles, and more especially heat-shrinkable sleeves, have been found to be useful for many purposes. Thus, for example, heat-recoverable sleeves may be used to provide a protective covering on a portion of a metal pipe or to make, protect and/or strengthen a connection between two metal pipes. Heat-recoverable sleeves have many advantages that make their use desirable; thus, for example, they can be provided with a measured amount of a sealant (for example a fusible material or a mastic) to ensure that a water-tight bond is obtained between the sleeve and the substrate(s) and they can generally be quickly and easily installed by relatively unskilled workmen, thus reducing labour costs. Because of the desirability of using heat-recoverable articles, an attempt has been made to use them to join plastic pipes which are now replacing metal sleeves for many applications but which, in many cases, are difficult to join in a reliable manner by conventional methods. It has proved, however, to be relatively difficult to connect plastic pipes by means of heat-recoverable sleeves, and when a joint is obtained it is not reliable, especially when it is subjected to relatively high temperatures and/or relatively high internal pressures.

SUMMARY OF THE INVENTION

The present invention provides an article for and a method of recovering a hollow heat-recoverable article onto a hollow substrate, the heat-recoverable article and the substrate each having at least one open end, which method comprises positioning the substrate between a rigid member (as hereinafter defined) and the heat-recoverable article, the substrate being positioned in the direction of recovery of the heat-recoverable article and at least part of the rigid member being in contact with the substrate, and heating the heat-recoverable article to cause recovery thereof, the substrate being such that it would be distorted if the heat-recoverable article were recovered onto it in the absence of the rigid member.

The invention also provides a method of recovering a heat-shrinkable sleeve onto a pipe, which comprises positioning a rigid member (as hereinafter defined) within the pipe, the outer surface of the rigid member abutting the inner surface of the pipe, and heating the heat-shrinkable sleeve to cause recovery thereof, the pipe being such that it would be distorted if the heat-shrinkable sleeve were shrunk onto it in the absence of the rigid member, and a method of providing a connection between two plastic pipes which comprises positioning a rigid (as hereinafter defined) substantially tubular member within the end portion of each pipe, the outer surface of the rigid member abutting the inner surface of each of the pipes and supporting the pipes at the joint, positioning a heat-shrinkable sleeve around the assembly, and heating the heat-shrinkable sleeve to cause recovery thereof, the pipes being such that they could be distorted if the heat-shrinkable sleeve were shrunk onto them in the absence of the rigid member.

DESCRIPTION OF THE PREFERRED EMBODIMENTS

Figure 1:
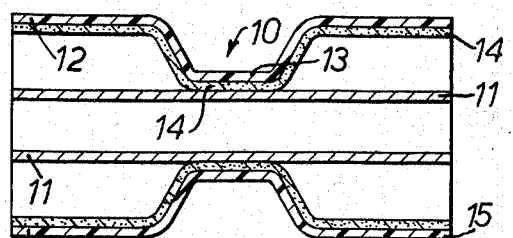
FIG. 1 is a cross-sectional side elevation of the article of the present invention.

It should be understood that, although the invention will mainly be described in this specification in terms of a heat-shrinkable member and a rigid member positioned within a substrate or a substrates over which the heat-shrinkable member is to be shrunk, the invention also includes the case, where appropriate, where a heat-expansible member is used to line a substrate or substrates and the rigid member is positioned around the substrate or substrates to be lined.

The use in accordance with the present invention of a rigid member which, when a heat-shrinkable article is used, is positioned inside, and in contact with, the substrate makes it possible to cover and, in particular, join plastic pipes or substrates with similar properties in a satisfactory and reliable way. The rigid member reduces and, in most cases prevents, distortion of the pipes (that is, the pipes substantially retain their shapes) and so makes it possible to obtain better engagement between the pipes and the heat-shrinkable article. A "rigid" member is a member which is not distorted under the influence of the recovery forces which the heat-recoverable member is capable of exerting at the temperature to which the heat-recoverable member is heated to cause recovery thereof.

When the method of the invention is used to join two or more hollow substrates, for example plastic pipes, a single heat-recoverable article and one or more rigid members may be used in conjunction with the substrates. Generally, the heat-recoverable article will have two open ends and be used in conjunction with two hollow substrates, and in this case a single rigid member, which contacts both of the substrates, is preferably used. In the latter case, the rigid member may be provided with a radial projection adapted correctly to position the hollow substrates in relation to the rigid member. It is, of course, also possible to position a separate rigid member in the end of each hollow substrate, the ends then being introduced into suitable openings in a heat-shrinkable connector. The heat-recoverable article may be branched and have, for example, three arms; in this case three hollow substrates may be joined. In a branched heat-recoveraable article, a separate rigid member is preferably used for each of the hollow substrates.

In another way of joining two or more hollow substrates, for example plastic pipes, using the method of the invention, a single rigid member, which may be branched, may be used in conjunction with the same number of heat-recoverable articles as there are substrates. Thus, for example, the rigid member may have three arms, each of which is used in conjunction with a separate heat-recoverable article.

The rigid member used, or at least one end thereof, may be tapered so that the member may more easily be inserted in the hollow substrate.

The method of the invention may be carried out particularly easily if the rigid member(s) and the heat-recoverable article(s) are combined to form a single article or coupling device. Accordingly, the invention also provides an article which comprises at least one heat-recoverable sleeve and at least one rigid sleeve (as hereinbefore defined) positioned in the direction of recovery of the heat-recoverable sleeve, part of the heat-recoverable sleeve firmly engaging the rigid sleeve and at least one end of the heat-recoverable sleeve being radially spaced from the rigid sleeve to allow the end of a tubular substrate to be inserted into the annular space between the rigid sleeve and the heat-shrinkable sleeve. Preferably the article of the invention includes a heat-shrinkable sleeve and a rigid sleeve positioned within the heat-shrinkable sleeve. Such an article may be manufactured, for example, by positioning a heat-shrinkable sleeve around a rigid sleeve so that it is radially spaced from the rigid sleeve and recovering part of the heat-shrinkable sleeve onto the rigid sleeve, at least one end of the heat-shrinkable sleeve remaining radially spaced from the rigid sleeve after recovery.

The article of the invention advantageously includes a single, unbranched, heat-shrinkable sleeve and a single rigid sleeve, the centre portion of the heat-shrinkable sleeve firmly engaging the rigid sleeve, and each end of the heat-shrinkable sleeve being radially spaced from the rigid sleeve. It is also possible, however, for the article to include a branched heat-shrinkable sleeve having three arms each of which arms is provided with a rigid sleeve, the inner end of each of the arms firmly engaging the respective rigid sleeve and the outer end of each of the arms being radially spaced from the respective rigid sleeve. Alternatively, the rigid sleeve may be branched and have three arms, each of which arms is provided with a heat-shrinkable sleeve, the inner end of each heat-shrinkable sleeve firmly engaging the respective arm of the rigid sleeve and the outer end of each heat-shrinkable sleeve being radially spaced from the respective rigid sleeve.

In the article of the invention, the enagagement between the heat-recoverable sleeve and the rigid sleeve is advantageously enhanced by means of an adhesive, which is preferably crosslinked. The adhesive preferably comprises polyethylene crosslinked by chemical means and advantageously comprises high density polyethylene crosslinked by 2,5-dimethyl-2,5-di-(tertiary butyl peroxy)-hexyne-3. If low density polyethylene is used as adhesive, this may be crosslinked by, for example, dicumyl peroxide, 2,5-dimethyl-2,5-di-(tertiary butyl peroxy)-hexyne-3, substituted ethanes which decompose on heating to give free radicals, for example diethyl dimethyl diphenyl-ethane and dipropyl dimethyl diphenyl-ethane, and a cyclic perketal such as that sold by Laporte as VP 1230. The polyethylene, whether high or low density, may be blended with one or more other polymers, for example ethyl vinyl acetate, ethylene/ethyl acrylate copolymers, ethylene/propylene rubbers and ethylene/propylene/non-conjugated diene terpolymers.

The article or coupling device of the invention has the advantage that the rigid insert acts as a support substantially to prevent deformation of the pipes to the joined, thereby giving a good bond, and also as a means to position the end of each pipe correctly in relation to the heat-shrinkable sleeve(s), even when the pipes are vertical. The coupler is more convenient in use than separtate heat-shrinkable and rigid sleeves.

It should be noted that when, for example, two or more pipes are joined using the method or article of the invention it is not necessary for the diameters of the pipes to be identical provided that the dimensions of the rigid member(s) are chosen such that each pipe contacts its respective rigid member.

The present invention utilizes a heat-recoverable article (an independently dimensionally heat-unstable article). In general, such an article is made of a material capable of having the property of elastic or plastic memory imparted thereto which is heated to a certain temperature and distorted under pressure to a configuration different from its normal configuration and then cooled while kept under pressure. If the article is made of a material which is wholly or partly crystalline and is distorted at a temperature at or above the crystalline melting point of the material, the article will have elastic memory. An article with elastic memory will not recover towards its original configuration until it is again heated at least to its crystalline melting temperature. If the article is made of a non-crystalline material, it is heated to a temperature at which the article can be distorted by pressure, and the distorted article then has the property of plastic memory. Examples of heat-recoverable materials are found in U.S. Pat. No. 2,027,962 and U.S. Pat. No. 3,086,242. Polymeric materials which have been corsslinked by chemical means or by irradiation, for example, with high energy electrons or nuclear radiation, are preferred for use in the present invention. A preferred polymeric material is polyethylene, especially high density polyethylene. Non-crystalline polymeric materials exhibiting the property of plastic memory, for example, polyurethane, ionomers, etc., can also be used in carrying out the present invention. Since the heat-recoverable articles used according to the present invention can be made either from materials having plastic memory or from materials having elastic memory, the terms "elastic memory" and "plastic memory" are used interchangeably in this specification and are intended to be mutually inclusive.

A heat-recoverable article used according to the present invention may alternatively comprise a heat-shrinkable metal, for example, a heat-shrinkable nickel-titanium alloy or a heat-shrinkable brass alloy. A number of suitable heat-shrinkable metals are described in U.S. patent application Ser. No. 51,809 filed July 2, 1970.

A rigid member used according to the invention is suitably a metal sleeve, advantageously a copper or stainless steel sleeve, or a sleeve of a rigid polymeric material, for example, poly-4-methyl-pentene-1, a polysulphone, polybutene-1, polyformaldehyde, a polyacetal, or a poly-imide material of the type described in U.S. Pat. No. 3,551,200 .

In the process of the invention a material (for example an adhesive, a fusible material or a mastic) which, when the heat-shrinkable member is recovered over the substrates(s), will give a firm joint (preferably a water-impervious joint) between the heat-shrinkable member and the substrate(s), is preferably positioned between the or each heat-recoverable member and the substrate(s). This maaterial may be applied to the substrate or, advantageously, to the heat-recoverable member. A fusible material is preferably such that it melts and flows at the temperature to which the heat-recoverable member is heated to cause it to recover. The fusible material, or the adhesive, may be such that it crosslinks during the shrinking process or subsequently. If a heat-shrinkable member which comprises a heat-shrinkable metal is used to cover or join a plastic pipe or pipes the use of an adhesive is very desirable so that cold flow of the plastic pipe in the long term can be substantially avoided.

A particularly suitable adhesive for use in accordance with the invention is one which comprises polyethylene particularly high density polyethylene, and a crosslinking agent therefor. Such an adhesive is especially useful where polyethylene pipes are being joined.

The decision on whether or not to use an adhesive in the method and article of the invention depends on the way in which the completed assembly or joint is to be used. It is desirable to use an adhesive whenever, for example a joint between two plastic pipes is to be subjected to high internal pressures and/or to raised temperatures to ensure that a reliable seal is maintained between the pipes and the recovered heat-recoverable member, and the adhesive selected must, of course be such that it retains its mechanical strength (and thus provides a good seal) at the pressures and temperatures to be used. The adhesive referred to above, which crosslinks during recovery of the heat-recoverable member is the preferred adhesive for use under raised temperatures and pressures.

The article and process of the invention may be used for covering or joining any substrates which tend to become deformed under the influence of the temperatures used, and recovery forces exerted, during recovery of a heat-recoverable member. They are, however, particularly useful for joining plastic pipes and, especially, polyethylene pipes as the latter are particularly difficult to connect by other methods.

Whether or not an adhesive is used to provide a reliable seal, the connection obtained between, for example, two pipes by the use of a heat-shrinkable sleeve and an inner rigid sleeve is stronger and more reliable if the recovered heat-shrinkable member is expanded less easily under high pressures and temperatures than are the pipes. This may be achieved by using a heat-shrinkable sleeve of relatively high wall thickness or by ensuring that the material of the sleeve has a higher modulus (2 % secant modulus) than does the material of the pipes.

Figure 2:
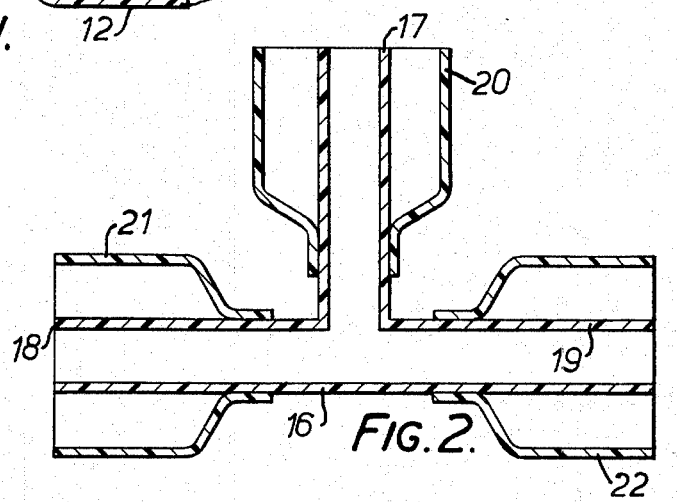
FIG. 2 is a cross-sectional side elevation of the article of the present invention.
Figure 3:
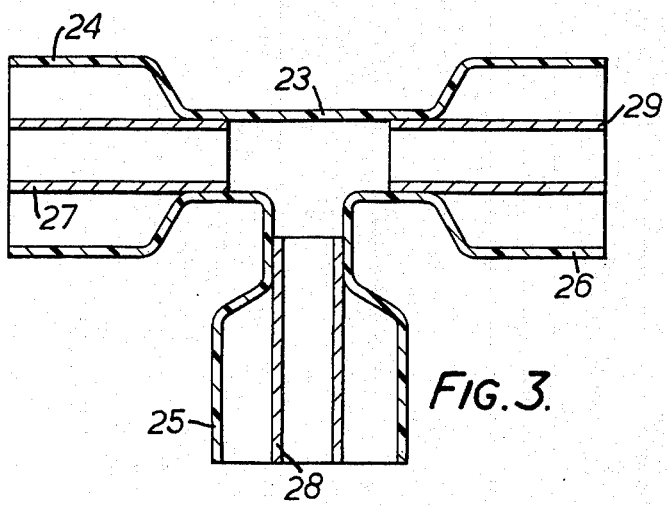
FIG. 3 is a cross-sectional elevation of the article of the present invention.
Figure 4:
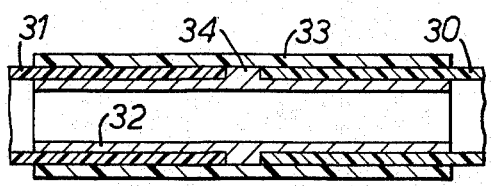
FIG. 4 is a cross-sectional side elevation of the article of the present invention after recovery onto the end of two substrates.
Figure 5:
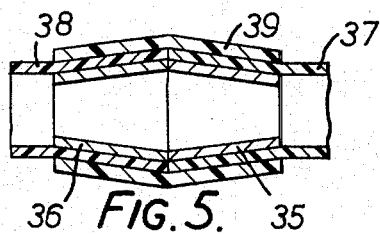
FIG. 5 is a cross-sectional side elevation of the article of the present invention after recovery onto the ends of two substrates.

The invention will now be illustrated, by way of example only, with reference to the accompanying drawings, in which FIGS. 1 to 3 show three different embodiments of the article (coupling device) of the invention and FIGS. 4 and 5 show connections made between two pipes using the method of the invention.

Referring now to the drawings, FIG. 1 shows a coupling device 10 which includes a rigid sleeve 11 and heat-shrinkable sleeve 12. A center portion 13 of the sleeve 12 is shrunk down onto the rigid sleeve 11 and is bonded thereto by a layer 14 of adhesive. The layer 14 of adhesive also extends inside the end portions 15 of the heat-recoverable sleeve 12, which end portions are radially spaced from the rigid sleeve 11. When the coupling device is used to connect two plastics pipes, one pipe is introduced into each end of the device, the diameter of the rigid sleeve 11 being so chosen that each pipe just fits over it and is supported by it during the shrinking of the heat-recoverable sleeve 12.

FIGS. 2 and 3 show two different forms of T-shaped branched couplers. The coupler shown in FIG. 2 has a T-shaped rigid insert 16, each of the arms 17, 18 and 19 of the T being provided externally with a respective heat-shrinkable sleeve 20, 21 and 22. The "inner" end of each of the sleeves 20, 21 and 22 (that is the end adjacent to the junction of the arms 17, 18 and 19 of the rigid sleeve 16) is in firm engagement with the respective arm 17, 18 and 19, while the other ("outer") end of each of the sleeves is radially spaced from the respective arm. In the coupler shown in FIG. 3, a heat-shrinkable sleeve 23 is T-shaped, each of the arms 24, 25 and 26 of the sleeve being provided internally with a respective rigid sleeve 27, 28 and 29. The "inner" end of each rigid sleeve 27, 28 and 29 is firmly engaged by a portion of the respective arm 24, 25 and 26 of the heat-shrinkable sleeve 23, and the "outer" end of each arm is radially spaced from the respective rigid sleeve. It should be understood that an adhesive could be used in the devices shown in FIGS. 2 and 3 to ensure that each heat-shrinkable sleeve remains in firm engagement with the respective rigid member(s), and that a layer of an adhesive, mastic or fusible material could be provided on the inner surface of those portions of heat-recoverable sleeve which are spaced from the rigid member(s) where it is desired, for example, to provide a water-tight seal between the heat-recoverable sleeve and a substrate, for example a pipe, about which it is recovered.

FIG. 4 shows a joint between two pipes 30 and 31. The joint is made using a rigid metal ferrule or sleeve 32 and a heat-shrinkable sleeve 33, these sleeves 32 and 33 being applied separately to the pipes 30 and 31 and not being combined in a couping device. The outer diameter of the rigid sleeve 32 is the same as the inner diameter of the pipes 30 and 31 so that the pipes just fit over the rigid sleeve. The rigid sleeve 32 is provided with an annular projection 34 which acts as a stop for the pipes and positions them correctly on the rigid sleeve. When the pipes 30 and 31 have been positioned on the rigid sleeve 32, the heat-shrinkable sleeve 33 is shrink over the assembly to provide a firm connection between the pipes. If desired, for example where the joint has to withstand high internal pressures, a fusible material, a mastic or, preferably, an adhesive (which adhesive may flow when hot), can be applied to the inside of the heat-shrinkable sleeve 33 or to the outside of the pipes 30 and 31 before the heat-shrinkable sleeve is shrunk into position.

The joint shown in FIG. 5 is essentially similar to that shown in FIG. 4 except that the rigid sleeve 32 shown in FIG. 4 is replaced by two separate rigid sleeves 35 and 36. Each of the rigid sleeves 35 and 36 is frusto conical in shape so that it may more readily be forced into a respective plastic pipe 37 or 38. When each pipe has been provided with its respective insert the ends of the pipes are held in abutting relationship and a heat-shrinkable sleeve 39 is shrunk down over them to form a connection between them. As in the joint shown in FIG. 4, a fusible material, a mastic or, preferably, an adhesive may be used to enhance the seal between the heat-shrinkable sleeve 39 and the pipes 37 and 38.

The following Examples illustrate the invention.

EXAMPLE 1

In a coupler as shown in FIG. 1, the rigid sleeve 11 was a copper tube, the outer diameter of which was 0.55 inches and the inner diameter of which was 0.50 inches. The heat-shrinkable sleeve 12 was made of crosslinked polyethylene and, when fully recovered, had a diameter of 0.50 inches and a wall thickness of 0.125 inches. The end portions 15 of the sleeve 12 had a diameter of 0.90 inches. The sleeve 12 was moulded from a high density polyethylene (density 0.96) which was crosslinked during the moulding process using 2,5-dimethyl-2,5-di-(tertiary butyl peroxy)-hexyne-3. The mixture from which the sleeve was moulded had the following composition: 10 parts Rigidex 25 (high density polyethylene), 10 parts Royalene 301 T, 3 parts Agerite Resin D (antioxidant), 15 parts HySil 233 (hydrated silica), 30 parts Vulcan 3 (carbon black), 2 parts triallyl cyanurate and 2 parts 2,5-dimethyl-2,5-di-(tertiary butyl peroxy)-hexyne-3. The sleeve 12 was internally coated with a layer 14 of a polymeric adhesive which contained a crosslinking agent. The adhesive used was a mixture, the parts being by weight, of 90 parts of high density polyethylene (sold under the Trade Name "Rigidex 25"), 10 parts of an ethylene/propylene/non-conjugated diene terpolymer sold under the Trade Name Royalene 301 T, 2 parts of 2,5-dimethyl-2,5-di-(tertiary butyl peroxy)-hexyne-3, and 3 parts of triallyl cyanurate.

The coupler described above was used to connect two crosslinked polyethylene pipes, each of which had an internal diameter of 0.55 inches and an external diameter of 0.75 inches. The pipes had been manufactured by the Engel process, in which polyethylene and a peroxide are mixed together, passed through a special extruder, the die and adjacent portions of which are heated to such a temperature that the peroxide decomposes and crosslinks the polyethylene. The pressure generated in the extruder (which pressure is very much higher than when uncrosslinked materials are to be extruded) then forces the crosslinked polyethylene through the die and into the final shape. The Engel process is described in an article by T. Engel entitled "Forging and crosslinking of thermoplastics" (Plastics and Polymers, June 1970, pages 174 to 179).

The two crosslinked polyethylene pipes were introduced into opposite ends of the coupler and the assembly was heated using a hot air blower until the outer sleeve of the coupler had recovered, the polymeric adhesive had flowed and the crosslinking agent in the adhesive had decomposed rendering the adhesive infusible. The temperature reached by the assembly was 150°C. The assembly was then connected into a hydraulic circuit which allowed it to be maintained at a temperature of 90°C with an internal pressure of 60 p.s.i. The assembly withstood this condition for 1000 hours without failure.

It should be noted that in the assembly, the recovered heat-shrinkable sleeve has a higher modulus than the pipes.

EXAMPLE 2

This Example illustrates the making of a joint of the type shown in FIG. 4. The heat-shrinkable sleeve 33 had the same diameter and wall-thickness when fully recovered as the heat-shrinkable sleeve used in FIG. 1, but had been uniformly expanded to an internal diameter of 1.0 inches. The inner surface of the sleeve 33 was coated with a layer of the adhesive used in Example 1. The rigid pipe 32 was a stainless steel sleeve having an outer diameter of 0.55 inches and an inner diameter of 0.50 inches; the annular projection 34 on the sleeve had an outer diameter of 0.75 inches.

Two crosslinked polyethylene sleeves of the type, and having the dimensions, described in Example 1 were fitted over opposite ends of the rigid pipe 32 and were moved inwards until their ends contacted the projection 34. The heat-shrinkable sleeve 33 was centered over the joint and heated until the sleeve had shrunk and the adhesive had flowed and become infusible. The assembly obtained was connected into a hydraulic circuit and tested as in Example 1. The assembly withstood an internal pressure of 60 p.s.i. and a temperature of 90°C for 1000 hours without failure.

COMPARATIVE TESTS

An attempt was made to join pipes of the type used in Examples 1 and 2 using the heat-recoverable sleeve and adhesive of Examples 1 and 2 but without using rigid sleeves. It was found that the heat required to recover the polyethylene sleeve caused the pipes to soften and distort because of their comparatively poor strengths at high temperatures. The distortion resulted in an effective reduction in the bore of the pipes as the sleeve recovered. Moreover, the adhesive is fluid when hot and this, together with the distortion caused by the high temperatures and the recovery forces, caused the sleeve to slip off, or tend to slip off, the pipes, making it impossible to obtain a reliable joint. In contrast to this, when a rigid sleeve is used in accordance with the invention, the above problems of distortion and slipping are substantially overcome and a reliable joint can be made simply and effectively.

What we claim is:

1. A one-piece coupling device for attachment to at least one distortable substrate comprising:
    a hollow heat recoverable member having at least one unrecovered open end and a second portion; and
    a rigid member held within said heat recoverable member at said second portion by heat recovery of said second portion to tightly grip said rigid member and extending into said unrecovered portion, said rigid member being spaced from said unrecovered portion in the direction of heat recovery of said heat recoverable member.

2. The coupling device as in claim 1 wherein a layer of adhesive is disposed between said rigid member and the second portion of said hollow heat recoverable member.

3. The coupling device as in claim 1 wherein said rigid member forms a sleeve concentrically disposed in said heat recoverable member.

4. The coupling device as in claim 1 wherein the material of said rigid member is selected form the group consisting of copper and stainless steel.

5. The coupling device as in claim 1 wherein the material of said rigid member comprises a polymeric material and wherein said polymeric material is selected from the group consisting of poly-4-methyl-pentene-1, a polysulphone, poly-butene-1, and a polymide material.

6. The coupling device as in claim 2 wherein said adhesive layer is crosslinked.

7. The coupling device as in claim 6 wherein said adhesive layer comprises a polyethylene crosslinked by chemical means.

8. The coupling device as in claim 7 wherein said adhesive layer comprises high density polyethylene crosslinked by means of 2, 5-dimethyl-2,5-di-(tertiary butyl-peroxy)-hexyne-3.

9. The coupling device as in claim 1 wherein said heat recoverable member comprises crosslinked polyethylene.

10. The coupling device as in claim 1 wherein said heat recoverable member comprises a heat recoverable metal.

11. A one-piece coupling device for attachment to a plurality of distortable substrates comprising:
a rigid sleeve member having a plurality of arm portions integrally formed at a junction; and
a hollow, heat recoverable member disposed about each of said arm portions, an end of each heat recoverable member positioned adjacent the junction being in firm engagement with each respective arm portion by heat recovery of said end to tightly grip each respective arm portion, the other end of each heat recoverable member being unrecovered and radially spaced from said respective arm portion, each arm portion being respectively positioned in each heat recoverable member in a direction of heat recovery of each heat recoverable member, each arm portion extending inside each unrecovered end, whereby a distortable substrate may be positioned between each unrecovered end and each respective arm portion, said rigid sleeve member substantially preventing radial distortion which would occur to the substrates in the absence of said rigid sleeve member when each unrecovered end is heat recovered.

12. A one-piece coupling device for attachment to a plurality of distortable substrates comprising
a hollow heat recoverable member having a plurality of arm portions integrally formed at a junction, each arm portion being provided with a rigid sleeve member, the end of each arm portion adjacent the junction firmly engaging a respective rigid sleeve member by heat recovery of said end and the other end of each arm portion being unrecovered and radially spaced from a respective rigid sleeve member, each rigid sleeve member being held within and positioned in the direction of heat recovery of each respective unrecovered end, said rigid sleeve member substantially preventing radial distortion which would occur to the substrate in the absence of each rigid sleeve member when said unrecovered end is heat recovered.

13. A method of attachment to the end of a hollow substrate by clamping the wall of the hollow substrate between a rigid member and a heat recoverable member including the steps of
deforming to a heat recoverable configuration a heat recoverable member,
positioning a rigid member relative to the heat recoverable member such that the heat recoverable member will recover toward the rigid member,
inducing recovery by heating of a selected portion of the heat recoverable member against the rigid member such that the rigid member and the heat recoverable member become mutually held to one another with at least a portion of the unrecovered heat recoverable member being coextensive with and spaced from at least a portion of the rigid member,
positioning a hollow substrate between the coextensive and spaced portions of the rigid member and the heat recoverable member, and
inducing recovery by heating of the heat recoverable member to tightly conform to the substrate.

14. The method of claim 13 wherein the rigid member is positioned inwardly of the heat recoverable member.

15. The method of claim 13 wherein the rigid member is positioned outwardly of the heat recoverable member.

16. The method of claim 13 further including the step of positioning fusible adhesive material on the heat recoverable member between the heat recoverable member and the rigid member.

17. The method of claim 13 wherein the step of inducing recovery of the hollow member to tightly conform to the substrate causes the substrate to tightly conform to the rigid member.

18. A one-piece coupling device for attachment to at least one distortable hollow substrate comprising,
a hollow, heat recoverable member having at least one unrecovered open end and a second portion; and
a hollow, rigid member generally concentrically oriented relative to said hollow, heat recoverable member in the direction of heat recovery of said hollow, heat recoverable member, said hollow, heat recoverable member having a heat recovered dimensional state resulting in an interference fit with said hollow, rigid member to hold said hollow, heat recoverable member and said hollow, rigid member together as one piece, said second portion being heat recovered on said hollow, rigid member and said unrecovered open end being spaced from said hollow, rigid member for receipt of a hollow substrate between said hollow, rigid member and said unrecovered open end said unrecovered open end adapted to recover on the hollow substrate upon being heated.

19. The coupling device of claim 18 wherein said hollow, rigid member is positioned inwardly of said hollow, heat recoverable member.

20. A one-piece coupling device for attachment to at least one distortable substrate comprising
a hollow, heat shrinkable member having at least one unrecovered open end and a second portion; and
a rigid member positioned within said hollow, heat shrinkable member said hollow, heat shrinkable member having a fully heat recovered inside dimension smaller than the outside dimension of said rigid member, said second portion being heat recovered about said rigid member to hold said hollow, heat shrinkable member and said rigid member together as one piece, said rigid member extending into said unrecovered portion and being spaced therefrom said unrecovered open end adapted to recover toward said rigid member upon being heated.

* * * * *